United States Patent
Wu et al.

(10) Patent No.: US 6,363,048 B1
(45) Date of Patent: Mar. 26, 2002

(54) DISC CLAMP MECHANISM

(75) Inventors: Min-Der Wu, Taichung; Wan-Wen Chiu, Feng-Yuan; Hsu-Pin Pan, Hsinchu; Hung-Kuang Hsu, Taipei; Chun-Min Chen, Chang-Hua; Chih-Hsuan Yang, Hua-Lien; Yea-Jiun Liou, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/360,845

(22) Filed: Jul. 24, 1999

(30) Foreign Application Priority Data

May 24, 1999 (TW) .............................. 88108435

(51) Int. Cl.⁷ .............................................. G11B 23/00
(52) U.S. Cl. ................................................ 369/271
(58) Field of Search ................................ 369/271, 270; G11B 17/028

(56) References Cited

U.S. PATENT DOCUMENTS 6,205,111 B1 * 3/2001 Hayakawa ................. 369/270

FOREIGN PATENT DOCUMENTS

| JP | 60-273672 | * 11/1985 |
| JP | 8-180629 | * 7/1996 |
| JP | 9-320158 | * 12/1997 |
| JP | 9-326149 | * 12/1997 |
| JP | 10-3720 | * 1/1998 |
| JP | 11-66788 | * 3/1999 |

* cited by examiner

Primary Examiner—David Davis
(74) Attorney, Agent, or Firm—W. Wayne Liauh

(57) ABSTRACT

A disc clamp mechanism for preventing a disc (e.g., DVD-ROM or CD-ROM) from slipping and/or loosening in a high speed rotation comprises a positioning member sized to the center hole of the disc having a hole for being mounted on a turntable, and an inclined surface; a helical spring within the positioning member; a disc-clamping member sized to the center hole of the compact disc having circumferential raised portions, recessed portions each extending from the raised portion, and flexible V-shaped members surrounded by two recessed portions and a raised portion; and an elastic plane-like member mounted on the positioning member. As such, the disc is secured by the raised portions, the inclined surface, and the turntable when loaded onto the disc-clamping member. This mechanism finds applications in the DVD-ROM or CD-ROM products. Further, a thinner construction, an easy assembly, and a high positioning precision are realized by this mechanism.

6 Claims, 6 Drawing Sheets

DISC CLAMP MECHANISM

FIELD OF THE INVENTION

The present invention relates to a disc clamp mechanism for preventing a disc from slipping and/or loosening from the turntable when the compact disc (e.g., DVD-ROM or CD-ROM) is on a turntable rotating at a high speed.

BACKGROUND OF THE INVENTION

Traditionally, a disc-clamping device employs an elastic O-ring or a coil spring to compress steel balls for clamping a disc as shown in FIGS. 1A–1B, in which FIG. 1A is a top view and FIG. 1B is a cross-section, of the related art disc-clamping device respectively. As shown, an O-ring 14 is provided on the periphery of an axis 12 of a turntable 10. A number of (e.g., 3) steel balls 18 are equally distributed on a joining periphery of a guide member 16 and the turntable 10. The guide member 16 guides the disc (not shown) already put on the turntable 10 to press the steel balls 18 which in turn press the O-ring 14 inwardly. After the disc is completely inserted onto the axis 12 of the turntable 10, the O-ring 14 again pushes the steel balls 18 to their original positions. As such, the disc is fixedly maintained on the turntable 10. However, a loosening condition is possible due to the insufficient clamping force exerted on the disc by the O-ring 14 and the steel balls 18. This is because the O-ring 14 and the steel balls 18 are not perfectly matched in size, i.e., an undesirable gap exists between the O-ring 14 and the steel balls 18 due to unperfect machining.

Another related art using a lever member as a disc clamp mechanism is disclosed in U.S. Pat. No. 5,774,445 as shown in FIGS. 2A–2B. In FIG. 2A, a disc 20 related to being inserted into a raised portion 22 of a turntable 10a by a disc-clamping device is shown. The disc 20 is pressed by a rotational force of the turntable 10a which in turn exerts a downward force on the turntable 10a. Consequently, the disc 20 is guided to a position between a clamping hook 24 and the turntable 10a by the clamping hook 24. Thereafter, the clamping hook 24 is pushed upwardly, thereby urging the disc 20 against the turntable 10 by the clamping hook 24 to fix the disc 20 as shown in FIG. 2B. The related art is without the drawback of insufficient clamping force exerted on the disc 20. However, this is unsatisfactory due to a problem arose from the radial positioning of the disc 20. In brief, the center holes of the discs 20 are not exactly the same size when manufactured. To the worse, tolerances of the center holes are not totally offset by the level member. As a result, it is difficult to get a precise radial positioning and, therefore, to be used with the DVD products that require a high precision positioning.

Thus, it is desirable to provide a disc clamp mechanism to overcome the above drawbacks of related art, and to be, therefore, suitable for use with CD-ROM and DVD ROM products.

SUMMARY OF THE INVENTION

It is therefore an object of the present invention to provide a compact disc clamp mechanism for affixing the compact disc which has a center hole. The mechanism includes a turntable having a raised hollow axis; a positioning member sized to the center hole of the disc having a hole for being mounted on the raised hollow axis and an inclined surface; a helical spring mounted within the positioning member for providing the upward or downward movement of the positioning member along the raised hollow axis; a cylindrical disc-clamping member sized to the center hole of the compact disc having a plurality of circumferential raised portions, a plurality of slit-like recessed portions each extending from the raised portion, and a plurality of V-shaped members surrounded by two slit-like recessed portions and one of the raised portions for bending from a first predetermined position to a second predetermined position when a force is exerted thereon; and an elastic plane-like member mounted on the positioning member for enhancing the restoration force of the deformed raised portions. As such, the compact disc is secured by the raised portions, the inclined surface, and the turntable when loaded onto the disc-clamping member. The compact disc clamping mechanism of the present invention find particularly useful applications in DVD-ROM products which require a relatively high precision.

It is another object of the present invention to provide a compact disc clamp mechanism for fixing the compact disc having a center hole comprising a turntable having a raised hollow axis; a cylindrical disc-clamping member sized to the center hole of the compact disc mounted on the raised hollow axis having a plurality of raised portions in circumference, a plurality of slit-like recessed portions each extending from the raised portion, and a plurality of V-shaped members surrounded by two slit-like recessed portions and a raised portion for bending from a first predetermined position to a second predetermined position when a force is exerted thereon; and an elastic plane-like member mounted within the disc-clamping member for enhancing the restoration force of the deformed raised portions. As such, the compact disc is secured by the raised portions and the turntable when loaded onto the disc-clamping member. This compact disc clamp mechanism finds a particular application in the CD-ROM products which require a relatively low precision.

The above and other objects, features and advantages of the present invention will become apparent from the following detailed description taken with the accompanying drawings.

DETAILED DESCRIPTION OF PREFERRED EMBODIMENTS

Figure 1A:
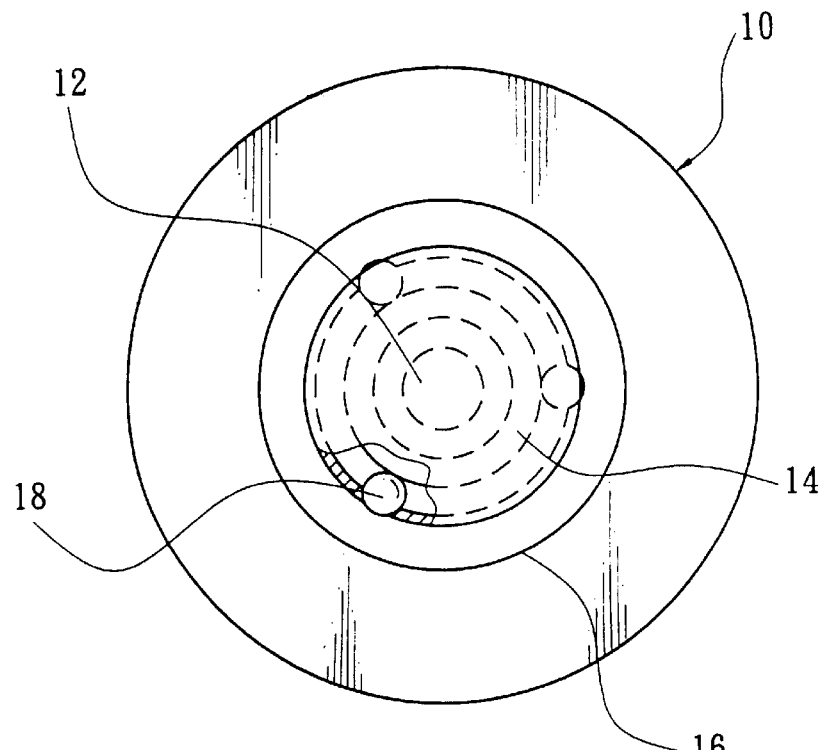
FIGS. 1A–1B are top and cross-sectional views, respectively, of a related art disc-clamping device which employs an elastic O-ring in cooperation with steel balls for clamping a disc respectively.
Figure 1B:
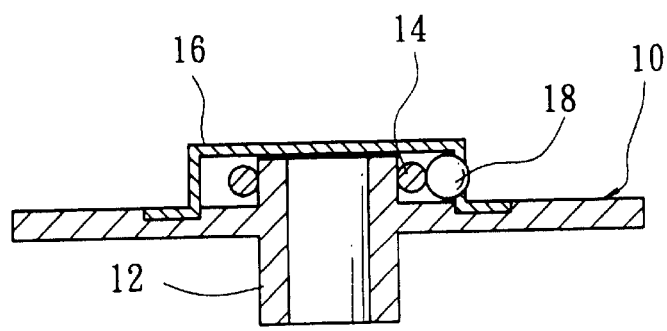
Figure 2A:
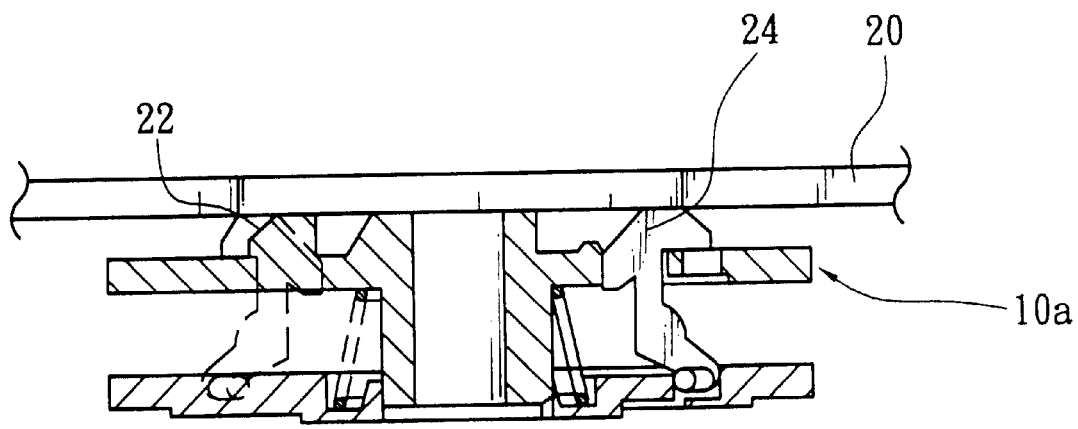
FIGS. 2A–2B are cross-sectional views, respectively, of another related art showing the operation of before and after the disc is loaded onto the turntable by cooperation of the level member and the clamping hook.
Figure 2B:
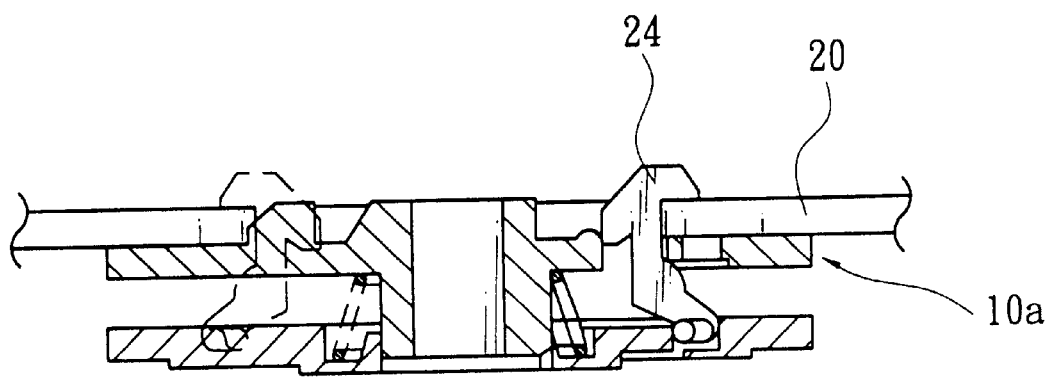
Figure 3:
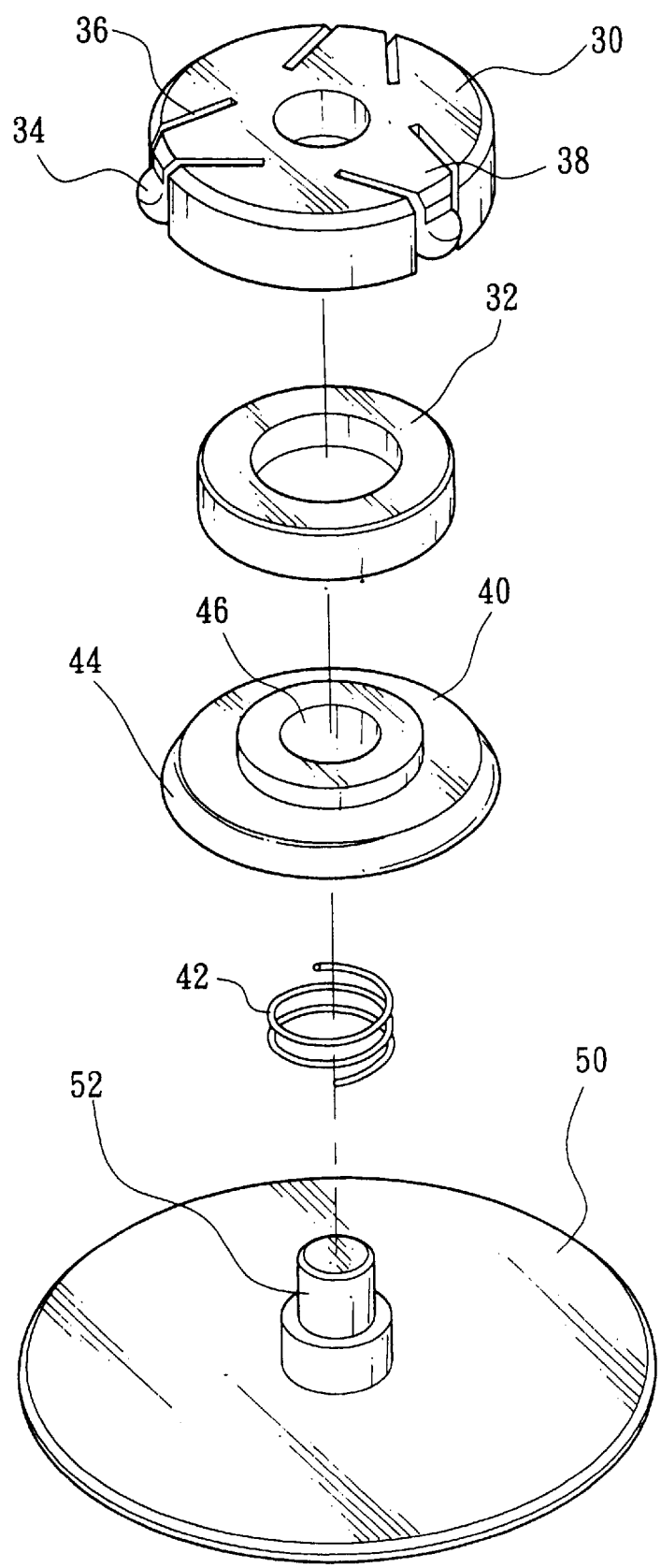
FIG. 3 is an exploded view of a disc-clamping device according to a first embodiment of the present invention.

As shown FIG. 3, a disc-clamping device of the first embodiment of the invention comprises a substantially cylindrical disc-clamping member 30, an elastic plane-like member 32, a positioning member 40, a helical spring 42 having an appropriate coefficient of elasticity, and a turntable 50. The disc-clamping member 30 mainly acts to provide a clamping force for fixing a disc (see FIG.8) on the turntable 50. The disc-clamping member 30 has a plurality of raised portions 34 on the circumference thereof. In this embodiment, three raised portions (or radially extending curved portions) are provided at 120 degrees relative to each other; however, while the more raised portions there are, the more even distribution of clamping force is provided. Three pairs of slit-like recessed portions 36 with each recessed portion 36 of the respective pair radiating from the raised portion 34 to form a flexible V-shaped member 38 to make it possible for the raised portion 34 to slightly bend in a axial direction. The positioning member 40 has a central recessed portion 46 to receive the helical spring 42 on an outer surface of the central recessed portion 46, and an inclined surface 44 formed on the periphery thereof. The turntable 50 has a pad 54 (see FIGS. 4–8) and a raised hollow axis 52 both on an upper surface thereof. The turntable 50 is located on a chassis (not shown) of a CD player. The turntable 50 is driven by a motor (not shown) by means of mounting the axis 52 onto a shaft of the motor. As such, the positioning member 40 is able to slightly move up and down on the turntable 50 by the axial expansion or compression of the spring 42 which in turn provides the force of the radial position of the disc.

Figure 4:
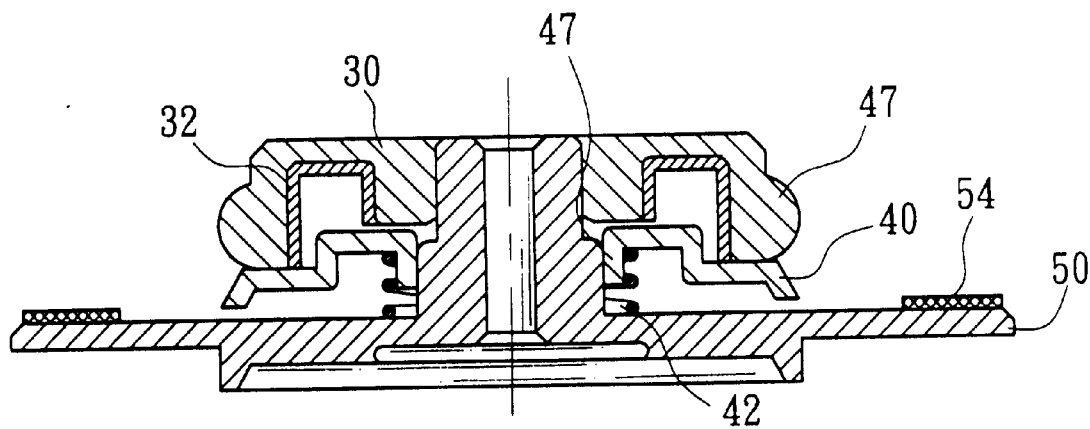
FIG. 4 is a cross-section view of the disc-clamping device of FIG. 3.
Figure 8A:
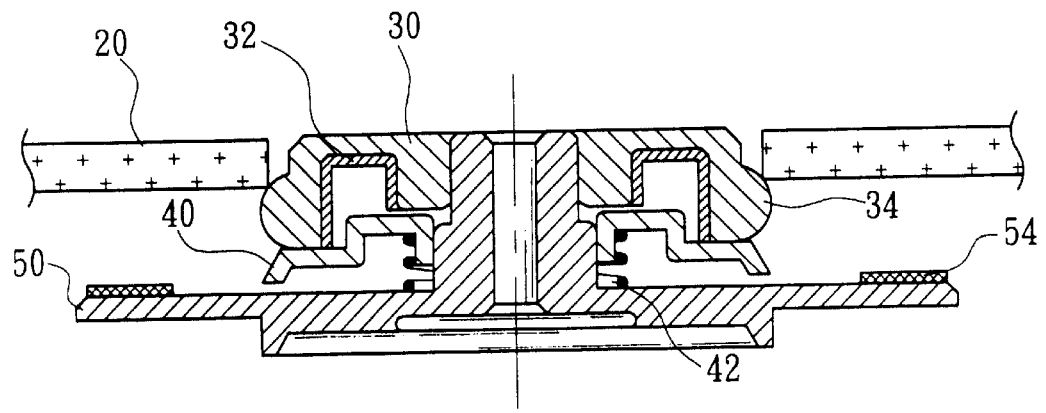
FIGS. 8a–8c are cross-section views of the disc-clamping device of FIG. 3 showing the phases of loading the disc onto the turntable respectively.

In assembling the device of the present invention, firstly the elastic plane-like member 32 is mounted into the disc-clamping member 30 and secured therein as shown in FIG. 4. Then, the spring 42, the positioning member 40, and the disc-clamping member 30 mount on the axis 52 of the turntable 50 in sequence. FIG. 4 shows that the positioning member has a sleeve 47 mounted on the axis 52 of the turntable and the spring 42 is mounted on the sleeve which allows the positioning member to move upward or downward. As shown in FIG. 8A, the inclined surface 44 is slightly greater in diameter than the hole of the disc to be mounted. As seen that the top of the spring 42 is urged against the bottom surface of the positioning member 40 and accordingly presses the positioning member 40 upwardly to abut on the bottom surface of the disc-clamping member 30. As such, the disc-clamping member 30 is fastened on the axis 52, while as stated above the positioning member 40 is able to slightly move up on the turntable 50 by the expansion, or move down to contact with the turntable 50 by a predetermined sufficient compression force of the spring 42.

Figure 5:
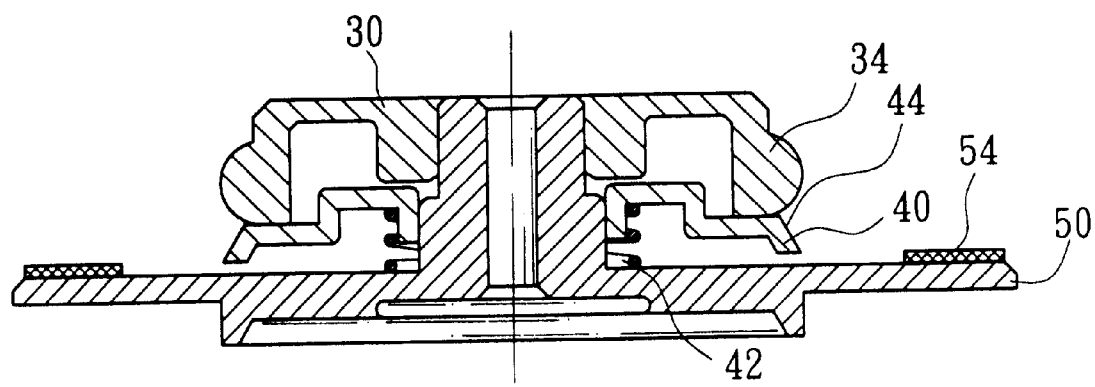
FIG. 5 is a cross-section view of the disc-clamping device according to a second embodiment of the present invention.

It is designed that the clamping on the disc is mainly provided by the disc-clamping member 30, while the positioning member 40 and the spring 42 provide the radial positioning of the disc as detailed later. Further, the elastic plane-like member 32 acts as enhancing the strength and the elasticity of the disc-clamping member 30 for clamping the disc as detailed later. The disc-clamping member 30 is made of a hard plastic material. As a result, the disc-clamping member 30 has a predetermined elasticity. As such, the elastic plane-like member 32 is omitted if the disc-clamping member 30 has a required sufficient elasticity and strength to clamp the disc. This is the case as shown in FIG. 5.

Furthermore, a pre-determined high precision positioning is obtained in both the first and the second embodiments by the cooperation of the positioning member 40 and the disc-clamping member 30 for making it possible to apply to operations involving DVD-ROM products which require a relatively high precision.

Figure 6:
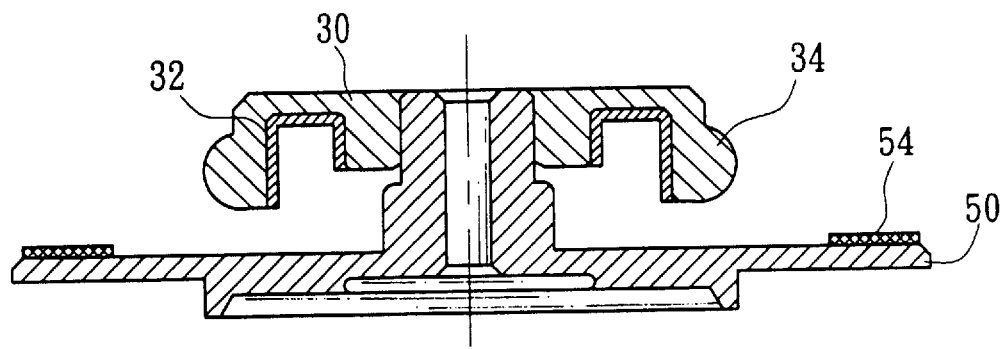
FIG. 6 is a cross-section view of the disc-clamping device according to a third embodiment of the present invention.
Figure 7:
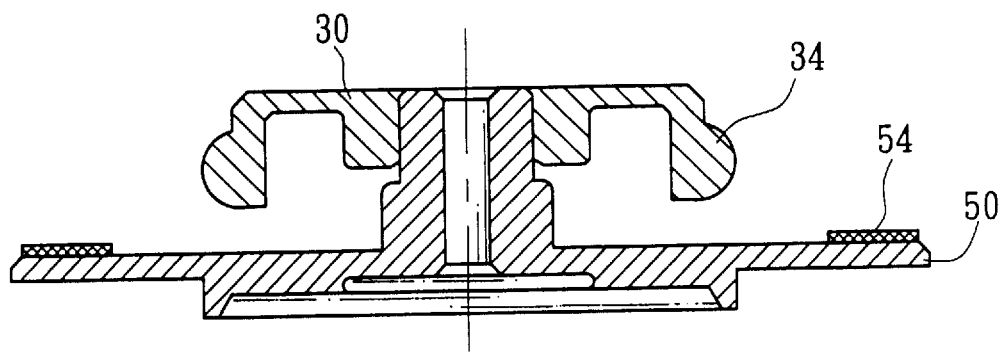
FIG. 7 is a cross-section view of the disc-clamping device according to a fourth embodiment of the present invention.

It is also possible to omit both the positioning member 40 and the spring 42 if a relatively low precision positioning is allowable. This is the case for application in the CD-ROM products as shown in FIGS. 6–7 respectively in which again the elastic plane-like member 32 is added as enhancing the strength and the elasticity of the disc-clamping member 30 specifically in FIG. 6. Additionally, the cost of components is saved. In the case of omission of the positioning member 40 and the spring 42, the radial positioning of the disc is provided solely by the raised portions 34 of the disc-clamping member 30. As such, the radial positioning capability provided by the disc-clamping device of the embodiments of FIGS. 6–7 is limited.

Figure 8B:
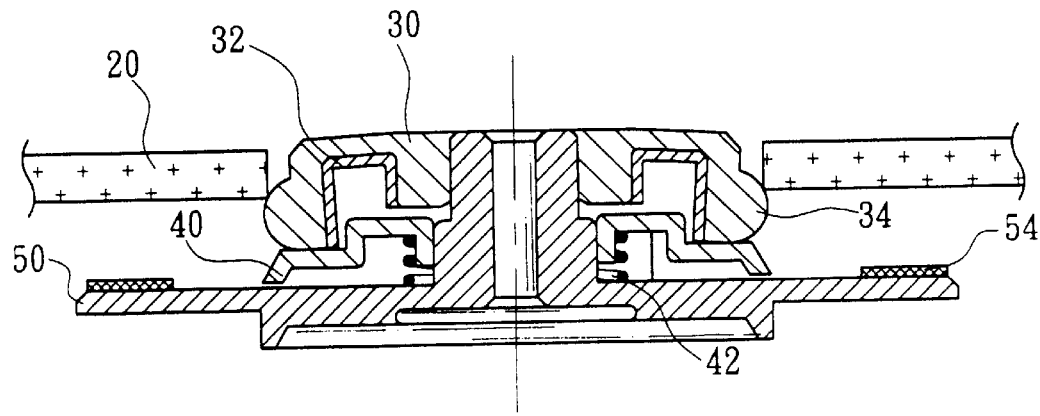
Figure 8C:
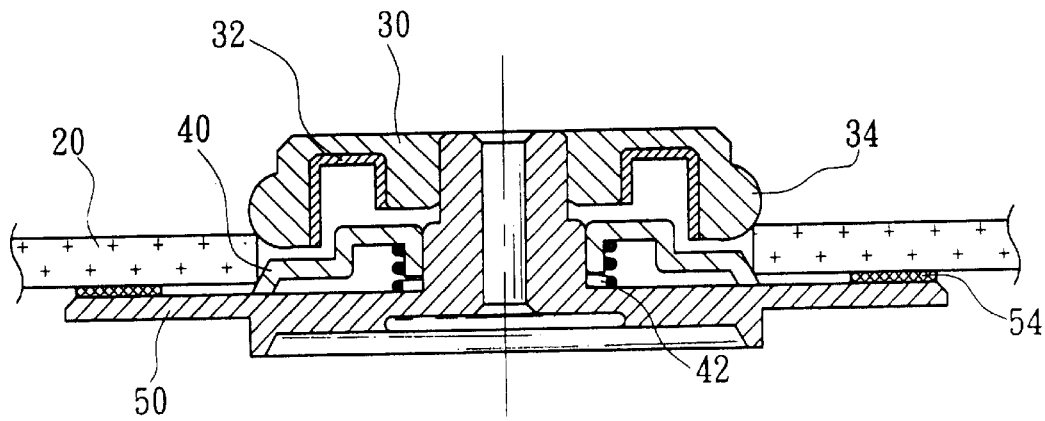

As shown in FIGS. 8a–8c, the steps of loading a disc 20 onto the turntable 50 are illustrated. Firstly, the disc 20 is loaded on the disc-clamping member 30. It is seen that the center hole of the disc 20 is sized to fit onto the periphery of the disc-clamping member 30 for being in contact with the raised portions 34. Then, the disc 20 exerts a force downwardly to press and deform the raised portions 34 to make it slightly bend inwardly (as shown in FIG. 8b). Then, the disc 20 is allowed to move downwardly to contact with the inclined surface 44 which in turn exerts a compression force on the spring 42 until the disc 20 contacts with the pad 54 on the turntable 50. Then, the spring 42 exerts an upward expansion force on the positioning member 40 to move it up. Finally, the disc 20 is secured by the raised portions 34, the inclined surface 44, and the pad 54. In brief, the disc 20 is clamped between the disc-clamping member 30 and positioning member 40, and securely seated on the turntable 50.

While the invention herein disclosed has been described by means of specific embodiments, numerous modifications and variations could be made thereto by those skilled in the art without departing from the scope of the invention set forth in the claims.

What is claimed is:

1. A disc clamp mechanism for clamping a disc having a center hole, comprising:
   a turntable having a raised hollow axis;
   a positioning member dimensioned to at least partially fit into a center hole of a disc to be mounted, said positioning member having a central cylindrical sleeve mounted on the raised hollow axis of the turntable, and an inclined circumferential surface, said inclined circumferential surface being greater in diameter than the center hole of the disc;
   a helical spring mounted on said central cylindrical sleeve of said positioning member to allow constrained upward and downward movements of said position member along said raised hollow axis; and
   a cylindrical disc clamping member at least dimensioned to partially into the center hole of the disc having a plurality of circumferential protrusions radially extending beyond the diameter of the center hold of the disc, a plurality of pairs of recessed portions each pair extending inwardly from one of said raised portions, and a flexible member defined by each pair of recessed portions and associated circumferential protrusion for imparting elasticity to said circumferential protrusion;
   wherein said circumferential protrusion of said cylindrical disc clamping member, said inclined circumferential surface of said positioning member, and said turntable cooperatively secure the disc in a clamped position.

2. The disc clamp mechanism of claim 1, wherein the positioning member is urged against the disc-clamping member by the helical spring in an uncompressed condition.

3. The disc clamp mechanism of claim 1, further comprising an elastic plane-like member mounted on the positioning member for enhancing a restoration force of the deformed raised portions.

4. The disc clamp mechanism of claim 1, wherein the number of the circumferential protrusions is three.

5. The disc clamp mechanism of claim 4, wherein said three circumferential protrusions have a phase angle of 120 degrees.

6. The disc clamp mechanism of claim 1, wherein each of said flexible members has a V-shape.

\* \* \* \* \*